(12) United States Patent
Chockler et al.

(10) Patent No.: US 8,327,334 B2
(45) Date of Patent: Dec. 4, 2012

(54) REPLAY OF PROGRAM EXECUTIONS USING CROSS-ENTROPY

(75) Inventors: Hana Chockler, Haifa (IL); Eitan Daniel Farchi, Pardes Hana (IL); Benyamin Godlin, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 1270 days.

(21) Appl. No.: 12/099,791

(22) Filed: Apr. 9, 2008

(65) Prior Publication Data

US 2009/0106740 A1 Apr. 23, 2009

Related U.S. Application Data

(63) Continuation-in-part of application No. 11/873,447, filed on Oct. 17, 2007, now Pat. No. 8,056,059.

(51) Int. Cl.
*G06F 9/44* (2006.01)
(52) U.S. Cl. ......... 717/127; 717/124; 717/126; 717/130
(58) Field of Classification Search ........................ None
See application file for complete search history.

(56) References Cited

U.S. PATENT DOCUMENTS 7,975,263 B2 * 7/2011 Geva et al. .................... 717/130
8,056,059 B2 * 11/2011 Chockler et al. .............. 717/126

OTHER PUBLICATIONS

Chockler et al., Cross-Entropy Based Testing, Nov. 2007, 8 pages, <http://ieeexplore.ieee.org/xpls/abs_all.jsp?arnumber=4401988>.*
A. Singh, Study of some distance measures for language and encoding identification, Jul. 2006, 10 pages, <http://delivery.acm.org/10.1145/1650000/1641985/p63-singh.pdf>.*
Corazza et al., Cross-entropy and estimation of probabilistic context-free grammars, Jun. 2006, 8 pages, <http://delivery.acm.org/10.1145/1230000/1220878/p335-corazza.pdf>.*
Ros et al., A hamming distance based VLIW/EPIC code compression technique, Sep. 2004, 8 pages, <http://delivery.acm.org/10.1145/1030000/1023853/p132-ros.pdf>.*

* cited by examiner

*Primary Examiner* — Thuy Dao
(74) *Attorney, Agent, or Firm* — F. Jason Far-hadian; Century IP Group

(57) ABSTRACT

A method for replay of program executions using cross-entropy is provided. The method comprises identifying a first sequence of decision points, wherein the first sequence represents a first execution of a logic code; identifying a second sequence of decision points, wherein the second sequence represents a second execution of the logic code; computing a distance between the first and second executions; and minimizing the distance between the first and second executions using cross-entropy, in response to determining that the second execution is not within a predetermined threshold distance of the first execution.

17 Claims, 3 Drawing Sheets

(Control program 115 does not include but monitors execution of test

REPLAY OF PROGRAM EXECUTIONS USING CROSS-ENTROPY

CROSS REFERENCE TO RELATED APPLICATIONS

This application is a continuation in part of, and claims the benefit of earlier filing date and right of priority to, U.S. application Ser. No. 11/873,447, filed on Oct. 17, 2007, now U.S. Pat. No. 8,056,059 the contents of which are hereby incorporated by reference herein in their entirety.

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to testing large programs and, more particularly, to replay of program executions using cross-entropy.

BACKGROUND

Exhaustive testing of a commercially written program code that has thousands of lines of codes and multitudes of execution paths is very challenging, particularly when there is a large number of processes executing concurrently.

Complex programs are commonly tested by way of non-exhaustive testing methods, such as simulation-based verification. Simulation-based verification techniques are generally based on a heuristic approach which is efficient in determining most errors in typical programs, but does not guarantee discovery of all errors (i.e., bugs). Simulation-based verification is traditionally used to verify the correctness of a program with respect to a set of input values. Different input values can induce a different execution path for the program under test. Moreover, in concurrent programs, the same set of input values can induce several different execution paths, due to scheduling decisions.

Execution of a program in a certain path is considered to be correct, if the program behaves as required (i.e., produces the expected output) for all possible input values for that path. Ideally, a complete verification will test all execution paths in a program for all possible input values for each path, and for all possible scheduling decisions. Obviously, this approach is very time consuming and expensive, if not impractical.

A more practical testing option focuses on discovering bugs that manifest themselves when the computing system is subjected to a heavy computational load during runtime (i.e., stress-testing). Another practical approach involves creating random interference in an event scheduler which leads to randomized interleavings in execution paths.

The interference is created by injecting noise to the scheduler forcing the scheduler to create uncommon interleavings, which are rare during usual execution. However, a chance of finding a very rare bug or a defective program routine that is only very rarely initiated is small, since the random distribution created by injecting noise cannot be adjusted to a specific pattern.

The most commonly used method to maximize the exhaustiveness of testing is coverage estimation. There is an extensive simulation-based verification research on coverage metrics, which provides a measure for determining the exhaustiveness of a test. Coverage metrics are used in order to monitor progress of the verification process, estimate whether more input sequences are needed, and whether direct simulation towards unexplored areas of the program are required.

In the related art systems, the metrics measure the part of the design that has been activated by the input sequences. For example, code-based coverage metrics measure the number of code lines executed during the simulation. There are a variety of different metrics used in coverage estimation, and they play an important role in the design validation effort. No useful method exists in the prior art that is directed to replaying or recreating a program execution that manifested a possibly erroneous pattern in the code. Thus, rare bugs can remain undetected even after testing has reached a high degree of coverage.

Accordingly, testing and verification methods and systems are needed that can overcome the aforementioned shortcomings by directing code testing to replay of program executions that enhance identification of bugs, especially those of the rare event type.

SUMMARY

The present invention is directed to systems, methods, and corresponding products that facilitate replay of program executions using cross-entropy.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for replay of program executions using cross entropy is provided. The method comprises identifying a first sequence of decision points, wherein the first sequence represents a first execution of a logic code; identifying a second sequence of decision points, wherein the second sequence represents a second execution of the logic code; computing a distance between the first and second executions; and minimizing the distance between the first and second executions using cross-entropy, in response to determining that the second execution is not within a predetermined threshold distance of the first execution.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods and products that facilitate replay of program executions using cross entropy.

In the following, numerous specific details are set forth to provide a thorough description of various embodiments. Certain embodiments may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Cross-entropy is a technique highly adapted to rare event simulation and is used for identifying the paths to an event with a very small probability of occurrence. Cross-entropy based testing comprises defining a performance function for a program, running the program many times in iterations, having partial control over program executions, and obtaining better values from the performance function at each iteration. The performance function may be used to detect an execution pattern associated with a particular rare event. A performance function for buffer overflow, for example, may be defined as the number of elements in a buffer.

Figure 1:
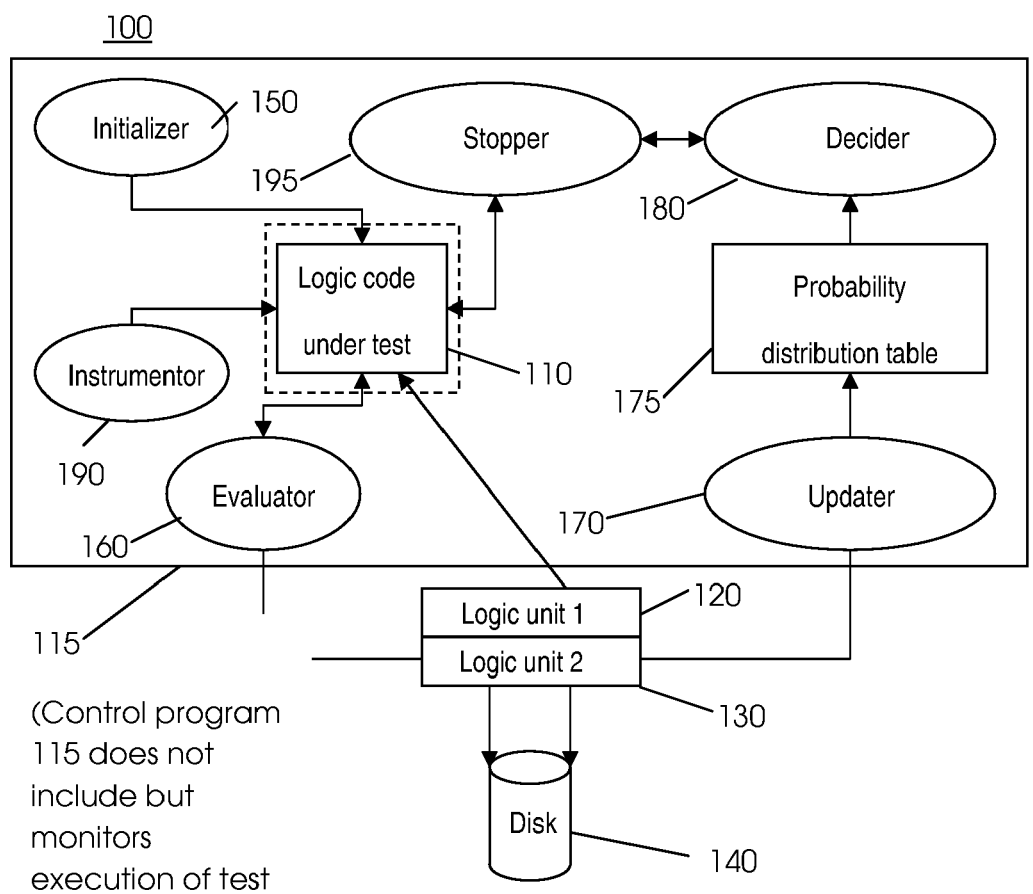
FIG. 1 is a block diagram of a system for testing large programs, in accordance with one embodiment.

Referring to FIG. 1, in accordance with one embodiment, system 100 comprises hardware and software components for testing a program using cross-entropy. As shown, a control program 115 is configured to monitor a logic code under test (hereafter test code) 110. A first logic unit 120 may be provided for executing test code 110, and a second logic unit 130 for running control program 115 to monitor the execution progress of test code 110. Depending on implementation, the first and second logic units 120, 130 may be implemented in a single or more than two logic units, for example. Memory 140 may be also provided for storing at least one of test code 110, control program 115, and data generated during the execution of test code 110.

Test code 110 may be implemented such that, when executed, one or more decision points (i.e., nodes) are encountered. At each node, a decision is made to branch out via one or more paths (i.e., edges) to other nodes in test code 110. Decisions are made at each node concerning which path to traverse based on a probability value assigned to each path. A probability value assigned to a path at a node defines the likelihood of choosing that path over another at the node, if the node is encountered during execution of test code 110.

Control program 115 may influence program execution by updating the probabilities assigned to different paths at each node to encourage traversal of decision paths that satisfy or more closely conform to a predetermined threshold for a performance function. Accordingly, control program 115 may amplify the likelihood of triggering a rare event and reveal the conditions under which such an event may occur by monitoring the decision paths chosen during various iterations of test code 110.

Referring back to FIG. 1, in accordance with one embodiment, control program 115 may comprise an initializer 150, an evaluator 160, an updater 170, a decider 180, an instrumentor 190 and a stopper 195. The components of control program 115 may be implemented in form of software, hardware, or a combination thereof depending on implementation.

Figure 2:
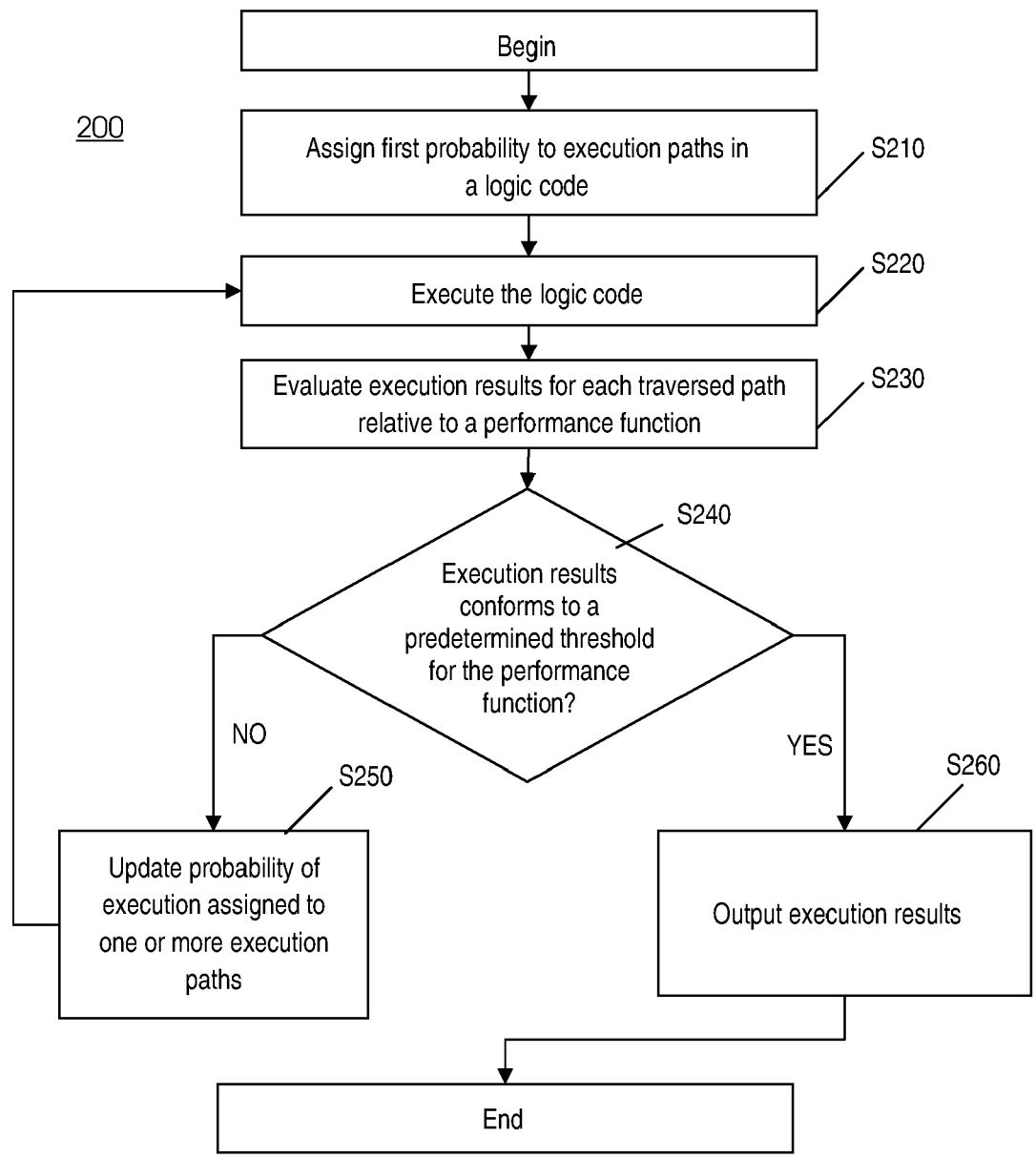
FIG. 2 is a flow diagram of a method for cross-entropy based testing, in accordance with one embodiment.

Referring to FIGS. 1 and 2, in accordance with one embodiment, initializer 150 may assign probability values to one or more decision paths for one or more nodes in test code 110 (S210) and then execute test code 110 (S220). Depending on implementation, the initial probability values may, for example, be equally distributed among all paths for each node. Alternatively, the initial probability values may be unequally distributed among different paths according to a predetermined distribution factor.

Evaluator 160 may evaluate one or more decision paths traversed during execution of test code 110 to determine whether the execution conforms to a predetermined threshold for a predefined performance function (S230). If the execution is not within the predetermined threshold, updater 170 may update the probability distributions for the nodes in test code 110 to increase the likelihood that one or more decision paths traversed in a subsequent execution of test code 110 will be in closer conformity with the predetermined threshold (S250).

In some embodiments, updater 170 may update probability distributions with values stored in probability distribution table 175 by decider 180. Decider 180 may set probability values according to results provided by evaluator 160 to improve the subsequent executions of test code 110 to be in closer conformity with the predetermined threshold.

For example, decider 180 may assign a low (e.g., zero) probability value to a certain path at a selected node, effectively reducing (or eliminating) the chance that the path will be selected during the next execution. Alternatively, a second path at the same node may be assigned a high (e.g., 100%) value, enhancing (or guaranteeing) the chances that the path will be selected during the next execution.

The probability of execution for some paths in a node may increase, when a probability value assigned to another path at the same node is reduced. For example, where probability is equally distributed among two paths as 50-50, if the probability value for one path is reduced to 25%, the probability value for the other path may be increased to 75%.

Instrumentor 190 may implement callbacks at synchronization points in test code 110, and stopper 195 may obtain mutually exclusive conditions for each executable path based on the callbacks from instrumentor 190. For example, on a call from instrumentor 190, stopper 195 may allow decider 180 to choose the path to be executed. If the path selected by decider 180 is not the one called, stopper 195 may delay the execution of the selected path. In one embodiment, stopper 195 may be configured to determine which path may be executed at an instance of execution of test code 110, based on callbacks provided by instrumentor 190.

Referring back to FIGS. 1 and 2, in accordance with one embodiment, once updater 170 has updated probability distributions, control software 115 may continue to monitor execution of test code 110 according to the updated probability distribution until evaluator 160 determines that an execution conforms to the predetermined threshold for the performance function. If so, control program 115 may output the execution records for test code 110 for further evaluation by an independent decision maker, such as a human operator, for example (S260).

In some embodiments, it may be desirable to replay or recreate an execution of a program as closely as possible. For example, if a rare event or potential bug is discovered during execution of a program, a replay of the execution may assist in reproducing or pinpointing the rare event and debugging the location in which the rare event occurred. A replay may be produced using the cross-entropy technique provided above, in accordance with one embodiment.

Figure 3:
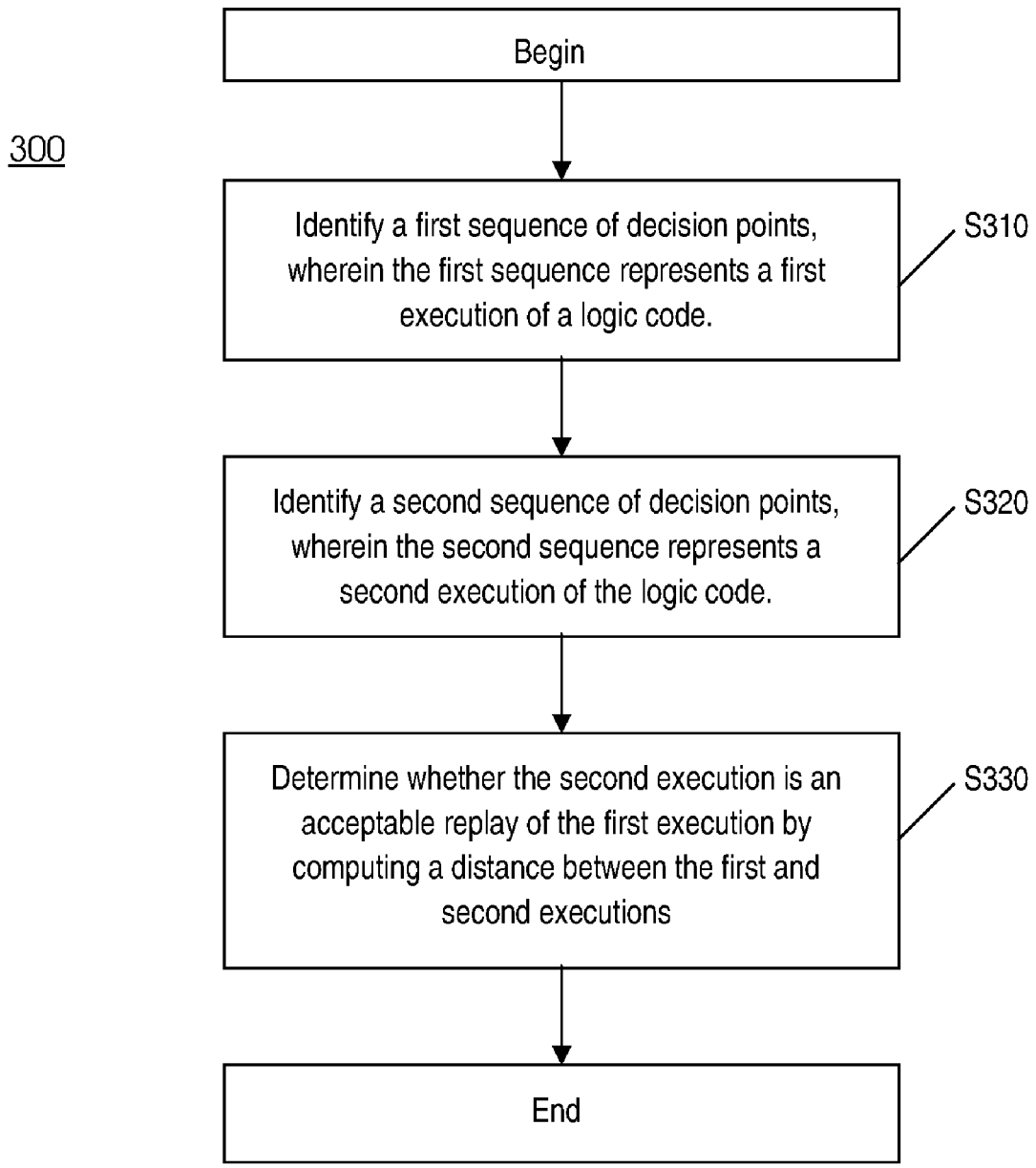
FIG. 3 is a flow diagram of a method for replay of program executions using cross-entropy, in accordance with one embodiment.

Referring to FIGS. 1 and 3, in accordance with one embodiment, control program 115 may identify a first sequence of decision points, wherein the first sequence represents a first execution of a logic code (e.g., test code 110) (S310). Control program 115 may also identify a second sequence of decision points, wherein the second sequence represents a second execution of test code 110 (S320).

Upon identifying the decision points for the first and second executions, control program 115 may compute the distance between the first and second executions (S330) and minimize the distance between the first and second executions using cross-entropy, if the second execution is not within a predetermined threshold distance of the first execution (S340). The distance measures how close the first and second executions are to each other on a control graph of test code 110. In accordance with one embodiment, the control graph may be a directed graph, wherein decision points are represented as nodes and decision paths are represented as edges. The performance function used during cross-entropy may be defined to be the distance between the first and second executions, in accordance with one embodiment.

In accordance with one embodiment, the distance may be computed by defining a total set of decision points to be the union of the decision points in the first and second sequences. The decision points in the total set may be in any arbitrary order with each decision point appearing at most once. Upon defining the total set, control program 115 may create a first enumeration of all the decision points in the total set that identifies the decision points included in the first sequence; create a second enumeration of all the decision points in the total set that identifies the decision points included in the second sequence; and apply a Hamming algorithm to the two enumerations.

In certain embodiments, control program 115 may not be able to determine whether one or more decision points were encountered during an execution, and a placeholder may be substituted for any unknown decision points in the corresponding first or second sequence. Though the placeholders may be included in the total set of decision points, the placeholders are left out of the first and second enumerations so that the Hamming algorithm receives valid inputs. Thus, control program 115 may produce at least a partial replay even if information is limited due to factors beyond control.

The Hamming algorithm is an algorithm known in the art that takes two enumerations of the same length as input and outputs the number of positions for which the elements of the two enumerations are different from each other. Alternatively, the Hamming algorithm returns the minimum number of substitutions required to change one enumeration into the other.

For the purpose of illustration, if $e1=\{p1, p2, p3, p4\}$ represents an execution during which decision points p1, p2, p3, and p4 were encountered, and $e2=\{p1, p2, p5\}$ represents an execution during which decision points p1, p3, and p5 were encountered, then $V=\{p1, p2, p3, p4, p5\}$ represents the union of e1 and e2. The decision points in V also included in e1 and e2, respectively, may be enumerated as $L1=11110$ and $L2=11001$ using bit representation, for example, wherein "1" indicates that a decision point was encountered and "0" indicates the opposite. Accordingly, the distance between e1 and e2, if computed based on the Hamming algorithm, is equal to 3, since L1 and L2 are different from each other in three positions.

Referring back to FIGS. 1 and 3, operations S320 and S330 may be repeated until evaluator 160 determines that the second execution is within a predetermined threshold distance (e.g., a Hamming distance of x) of the first execution. As provided earlier, updater 170 may update the probability distributions for decision paths to increase the likelihood of conformity with a predetermined threshold and thereby adjust the probability for reducing the Hamming distance between two selected execution paths.

In different embodiments, the systems and methods disclosed herein may be implemented either entirely in the form of hardware or entirely in the form of software, or a combination of both hardware and software elements. For example, system 100 may comprise a controlled computing system environment that may be presented largely in terms of hardware components and software code executed to perform processes that achieve the results contemplated by the system of the present disclosure.

A computing environment in accordance with an exemplary embodiment may be composed of a hardware environment and a software environment. The hardware environment comprises the machinery and equipment that provide an execution environment for the software; and the software provides the execution instructions for the hardware as provided above.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for replay of program executions, the method comprising:
   identifying a first sequence of decision points, wherein the first sequence represents a first execution of a logic code;
   identifying a second sequence of decision points, wherein the second sequence represents a second execution of the logic code;
   computing, using one or more processors, a distance between the first and second executions; and
   minimizing, using one or more processors, the distance between the first and second executions using cross-entropy, in response to determining that the second execution is not within a predetermined threshold distance of the first execution,
   wherein the computing comprises:
   defining a total set of decision points as the union of decision points in the first and second sequences;
   creating a first enumeration of the decision points in the total set that identifies the decision points included in the first sequence;
   creating a second enumeration of the decision points in the total set that identifies the decision points included in the second sequence; and
   applying a Hamming algorithm to the first and second enumerations.

2. The method of claim 1, wherein place holders are substituted in the first and second sequences for unknown decision points.

3. The method of claim 1, wherein the distance measures how close the first and second executions are to each other on a control graph of the logic code.

4. The method of claim 3, wherein the control graph is a directed graph with decision points represented as nodes and decision paths represented as edges.

5. The method of claim 1, wherein unknown decision points are left out of the first and second enumerations.

6. The method of claim 1, wherein a performance function used in cross-entropy is defined as the distance between the first and second executions.

7. A system comprising:
   one or more processors;
   a logic unit for identifying a first sequence of decision points, wherein the first sequence represents a first execution of a logic code;
   a logic unit for identifying a second sequence of decision points, wherein the second sequence represents a second execution of the logic code;
   a logic unit for computing a distance between the first and second executions; and
   a logic unit for minimizing the distance between the first and second executions using cross-entropy, in response to determining that the second execution is not within a predetermined threshold distance of the first execution,
   wherein the computing comprises:
   defining a total set of decision points as the union of decision points in the first and second sequences;
   creating a first enumeration of all the decision points in the total set that identifies the decision points included in the first sequence;
   creating a second enumeration of all the decision points in the total set that identifies the decision points included in the second sequence; and
   applying a Hamming algorithm to the first and second enumerations.

8. The system of claim 7, wherein place holders are substituted in the first and second sequences for unknown decision points.

9. The system of claim 7, wherein the distance measures how close the first and second executions are to each other on a control graph of the logic code.

10. The system of claim 9, wherein the control graph is a directed graph with decision points represented as nodes and decision paths represented as edges.

11. The method of claimer 7, wherein unknown decision points are left out of the first and second enumerations.

12. The method of claim 7, wherein a performance function used in cross-entropy is defined as the distance between the first and second executions.

13. A computer program product comprising a non-transitory data storage medium having a computer readable program, wherein the computer readable program when executed on a computer causes the computer to:
    identify a first sequence of decision points, wherein the first sequence represents a first execution of a logic code;
    identify a second sequence of decision points, wherein the second sequence represents a second execution of the logic code;
    compute a distance between the first and second executions; and
    minimize the distance between the first and second executions using cross-entropy, in response to determining that the second execution is not within a predetermined threshold distance of the first execution,
    wherein the computing comprises:
    defining a total set of decision points as the union of decision points in the first and second sequences;
    creating a first enumeration of all the decision points in the total set that identifies the decision points included in the first sequence;
    creating a second enumeration of all the decision points in the total set that identifies the decision points included in the second sequence; and
    applying a Hamming algorithm to the first and second enumerations.

14. The computer program product of claim 13, wherein place holders are substituted in the first and second sequences for unknown decision points.

15. The computer program product of claim 13,
    wherein the distance measures how close the first and second executions are to each other on a control graph of the logic code,
    wherein the control graph is a directed graph with decision points represented as nodes and decision paths represented as edges.

16. The computer program product of claim 13, wherein unknown decision points are left out of the first and second enumerations.

17. The computer program product of claim 13, wherein a performance function used in cross-entropy is defined as the distance between the first and second executions.

* * * * *